(No Model.)
H. F. LELAND.
STEAM OR WATER TRAP.
No. 407,224.  Patented July 16, 1889.
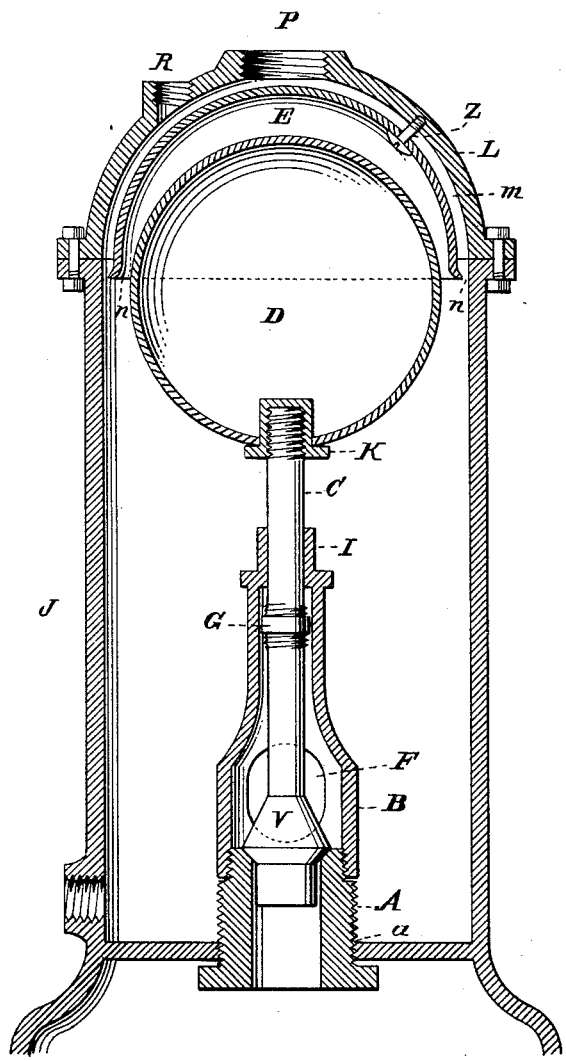

UNITED STATES PATENT OFFICE.

HIRAM F. LELAND, OF LOCKPORT, NEW YORK.

STEAM OR WATER TRAP.

SPECIFICATION forming part of Letters Patent No. 407,224, dated July 16, 1889.

Application filed February 15, 1889. Serial No. 299,964. (No model.)

*To all whom it may concern:*

Be it known that I, HIRAM F. LELAND, a citizen of the United States, and a resident of Lockport, in the county of Niagara and State of New York, have invented certain new and useful Improvements in Water or Steam Traps; and I do declare the following to be a full, clear, and exact description of the invention, such as will enable others skilled in the art to which it appertains to make and use the same, reference being had to the accompanying drawing, and to letters or figures of reference marked thereon, which forms a part of this specification.

The figure of the drawing is a representation of a central vertical section of the invention.

This invention has relation to steam or water traps; and it consists in the novel construction and combination of devices, all as hereinafter set forth, and pointed out in the appended claim.

In the accompanying drawing, the letter A represents the valve-seat, which is a perforated and threaded plug adapted to engage a threaded opening $a$ in the bottom of the trap-vessel J. The upper end of the valve-seat plug receives the lower end of a tubular guide B, which is screwed or otherwise fastened thereon, said guide extending directly upward above the valve-seat and forming a bearing I at its upper end for the stem C of the valve V, which rests upon the valve-seat and closes the outlet through the same at all times, except when it is raised. To the upper end of the valve-stem is directly secured the spherical float D. Openings F are provided in the tubular guide B, above the valve for the inflow of the water. On the valve-stem is provided a collar-stop G, which is located a short distance below the bearing I, and serves by its contact with the lower shoulder of said bearing to check the upward movement of the valve, so that the latter is prevented from rising from its seat farther than is necessary for the discharge. This stop G may be adjustable. The float D is provided with a threaded socket K, to engage the upper end of the valve-stem.

E represents a dome-shaped guard, which is secured to the cover or top L of the trap over the float D. This guard or spreader is separated from the said cover or top by an interval, as at $m$, which forms the passage-way for the entering water, and its diameter is greater than that of the float, so that the water entering will not touch said float in its descent, but will fall clear from the outer free edge $n$ of the guard.

P indicates where the water enters the trap, and R designates where the automatic air-valve is connected.

The dome-shaped guard may be secured to the top of the trap by means of a threaded pin Z.

As water enters the trap its level rises until the float is raised, directly lifting the valve-stem and valve and causing a discharge, which causes a fall of the float and consequent seating of the valve.

The float and the discharge-valve are designed to be in the same vertical axial line, in order that the operation of the trap may be exact and uniform.

Having described this invention, what I claim, and desire to secure by Letters Patent, is—

The combination of the trap-vessel having the bevel-faced valve-seat, the tubular guide connected to said seat, the bevel-faced valve having an upwardly-extending stem provided with an annular stop, the spherical float applied to the upper end of said stem, and the hemispherical guard secured to the under side of the dome of the trap-vessel and having the lower deflected edges of flanges, substantially as set forth.

In testimony whereof I affix my signature in presence of two witnesses.

HIRAM F. LELAND.

Witnesses:
  ARTEMOS A. BRADLEY,
  ELEAZER BALDWIN.